United States Patent [19]
Chang

[11] Patent Number: 5,264,939
[45] Date of Patent: Nov. 23, 1993

[54] APPARATUS AND METHOD FOR GENERATING AN INTERLACED VIEWING SIGNAL FROM THE OUTPUT SIGNAL OF A NON-INTERLACED CAMERA SYSTEM

[75] Inventor: Win-Chyi Chang, Penfield, N.Y.

[73] Assignee: Eastman Kodak Company, Rochester, N.Y.

[21] Appl. No.: 890,895

[22] Filed: May 29, 1992

[51] Int. Cl.⁵ .............................................. H04N 5/335
[52] U.S. Cl. ........................... 358/213.22; 358/213.29; 358/213.11
[58] Field of Search ............... 358/213.22, 213.23, 358/213.28, 213.29, 213.11, 212, 41, 140; 257/215, 232, 912

[56] References Cited
U.S. PATENT DOCUMENTS

| | | | |
|---|---|---|---|
| 4,330,796 | 5/1982 | Anagnostopoulos et al. | 358/213.26 |
| 4,553,167 | 11/1985 | Kinoshita | 358/213.22 |
| 4,603,254 | 7/1986 | Takano et al. | 250/327.2 |
| 4,740,828 | 4/1988 | Kinoshita | 358/48 |
| 4,766,494 | 8/1988 | Doyle | 358/140 |
| 4,876,590 | 10/1989 | Parulski | 358/41 |
| 4,879,601 | 11/1989 | Buck et al. | 358/213.22 |
| 4,996,600 | 2/1991 | Nishida et al. | 358/213.22 |

Primary Examiner—Joseph Mancuso
Assistant Examiner—Tuan V. Ho
Attorney, Agent, or Firm—Raymond L. Owens

[57] ABSTRACT

A camera system and method of operation is disclosed which produces an NTSC type interlaced signal from a high resolution non-interlaced camera system by summing in a shift register first and second rows thereof and discarding via diodes on a charge coupled device (CCD) sensor chip third and fourth rows of every four rows of pixel information to produce odd fields of an interlaced signal. Even fields are produced by discarding the first and second rows and summing the third and fourth rows. Sync and blanking pulses may be added to complete the signal.

8 Claims, 3 Drawing Sheets

APPARATUS AND METHOD FOR GENERATING AN INTERLACED VIEWING SIGNAL FROM THE OUTPUT SIGNAL OF A NON-INTERLACED CAMERA SYSTEM

FIELD OF THE INVENTION

This invention relates to electronic cameras, and more particularly to high resolution camera systems.

BACKGROUND OF THE INVENTION

Electronic cameras enjoy some important advantages over the traditional film camera because they store captured images in electronic form. Electronic storage is much less expensive than film; it is very high density, taking up much less space; it is non-fading, i.e., unlike film, its color information is substantially permanent; and it provides easy retrieval via computer. Electronic cameras of the current generation were designed primarily to have their captured images displayed on a television set. They are, therefore, made to be compatible with the National Standards Television Committee (NTSC) Standards. Among other things, the NTSC Standards specify interlaced fields of 262½ horizontal lines at 1/60 second intervals to produce complete frames containing 525 lines at a rate of 30 frames per second. Each field, therefore, contains every other line of the complete frame, and fields of odd lines alternate with fields of even lines.

Charge coupled device (CCD) sensors used by these cameras were designed specifically for this service. A typical device may have, for example, an array of 760 by 484 discrete photosensor sites, producing 760 by 484 pixel resolution and 484 horizontal lines. The device also provides a vertical shift register associated with each vertical column of photosensor sites, and the ability to simultaneously shift the pixel charges in alternate rows into their associated vertical registers. When the pixel charges in the vertical shift registers are sequentially shifted into a horizontal shift register for output, they produce a field containing every other line of pixel information. The following field contains the lines of pixel information omitted in the previous field. When the NTSC specified sync pulses are added, fields of 242 lines instead of 262 present no problem to the television set.

While the resulting 760×484 pixel resolution is quite acceptable for television viewing, it produces a print which is of poor quality compared to standard film cameras. There exists a need, particularly in commercial and industrial use, for a high-resolution, electronic cameras designed primarily for computer access to stored images and high quality prints. At least one new CCD photosensor has been developed to meet this need. The Kodak KAI-1000 interline CCD sensor has an array of 1024 by 1024 photosensor sites and 1024 vertical shift registers. For better computer access and printing, the sensor operates in the non-interlaced mode so that adjacent lines are stored in sequence. In order to provide a frame rate of 30 frames per second to capture motion and a reasonable read-out rate, the sensor has two horizontal shift registers. Two adjacent lines are read out simultaneously at a 20 MHz readout rate.

Along with the demand for the kind of performance this sensor offers is a need for image feedback so that accurate subject framing can be achieved. This is particularly true in the case of a camera for industrial or institutional use. The high resolution images produced by this type of sensor, however, cannot easily be displayed in real time. They require expensive wideband circuits and special high definition television techniques. An ordinary television type display, on the other hand, uses well known low cost circuits, but requires an interlaced signal.

It is desirable, therefore to have low cost apparatus and a method for producing a low resolution, real time image for a high resolution non-interlaced camera system.

SUMMARY OF THE INVENTION

Viewed from one aspect, the present invention is directed to apparatus for generating a low resolution interlaced video signal having alternating odd and even fields from a high resolution CCD camera system which produces pixel information representing an image in consecutive rows. The apparatus comprises a video channel, dumping means for selectively discarding produced rows of pixel information, a shift register for transferring produced rows of pixel information into the video channel, and first, second, and third driving means. The first driving means drives the dumping means to repeatedly discard a first predetermined set of rows of each consecutive group on n rows of produced pixel information representing a first image and alternating odd images thereafter. The second driving means drives the register to transfer to the video channel, in the order produced, the rows of produced pixel information not discarded by the dumping means; and the third driving means drives the dumping means to repeatedly discard a second set of rows of each consecutive group of n rows of produced pixel information representing a second image and alternating even images thereafter. The rows of pixel information transferred to the video channel which represent the first and alternating odd images constitute the odd fields, and those transferred which represent the second and alternating even images constitute the even fields of the video signal.

A typical embodiment of the above described apparatus further comprises a sync insert circuit for adding horizontal blanking and sync pulses between lines and vertical blanking and sync pulses between fields to conform to NTSC standards. The register and the dumping means can be part of a CCD sensor chip, requiring the addition of only an inexpensive video channel and simple timing circuits to produce the video signal.

Viewed from another aspect, the present invention is directed to a method for generating a low resolution interlaced video signal having alternating odd and even fields from a high resolution CCD camera system which produces pixel information representing an image in consecutive rows. The method comprises a first step of repeatedly transferring into a video channel a line of video information representative of at least a first predetermined row, and discarding the other rows of each consecutive group of n rows of produced pixel information representing a first image to form an odd field. The method comprises a second step of repeatedly transferring into said video channel a line of video information representative of at least a second predetermined row, different from said first predetermined row, and discarding the other rows of each consecutive group of n rows of produced pixel information representing a second image to form an even field; and comprises a third step of alternating between first and second steps.

The invention will be better understood from the following more detailed description taken in conjunction with the accompanying drawings and claims.

DETAILED DESCRIPTION

Figure 1:
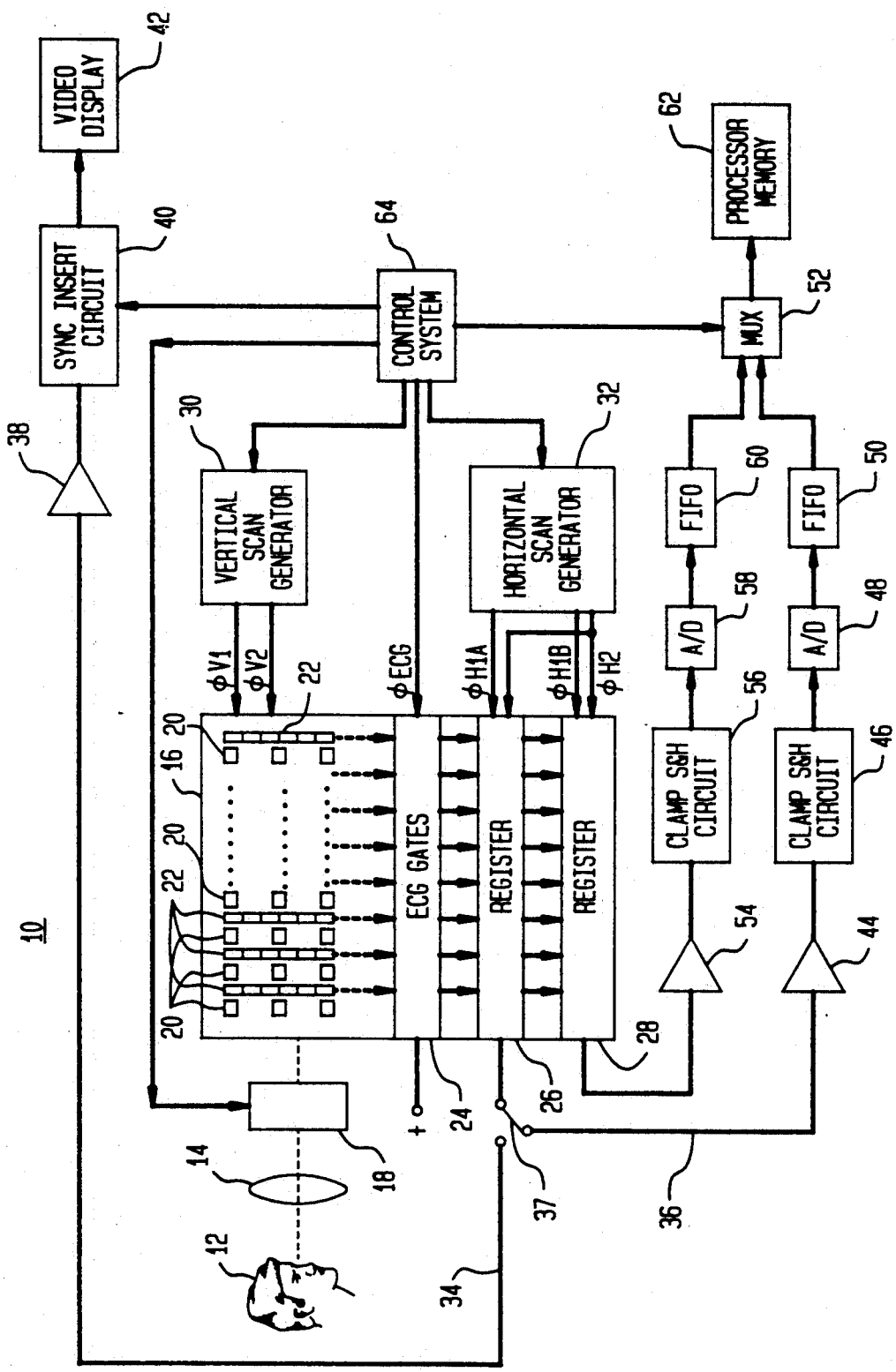
FIG. 1 is a block diagram of a camera system embodying the present invention.

Referring now to FIG. 1, there is shown in block diagram form a camera system 10 in accordance with the present invention which is useful to form an image of an illuminated object (shown as a human head) 12. System 10 comprises a lenses system 14, a Charge coupled device (CCD) sensor 16, a shutter 18, a vertical scan generator 30, a horizontal scan generator 32, a video amplifier 38, a sync insert circuit 40, a video display 42, clamping sample and hold (clamp S & H) circuits 46 and 56, analog to digital converters (A/D) 48 and 58, first in, first out (FIFO) buffers 50 and 60, multiplexer (MUX) 52, a switch 37, a utilization device (processor/memory) 62, and a control system 64.

Light from the illuminated object 12 to be photographed is focused via the lens system 14 onto the CCD sensor 16 through the shutter 18 which is optional and may be used to control the amount of exposure for taking still pictures. When system 10 is operating continuously for viewing or for recording motion, shutter 18 would normally not be used. CCD sensor 16 has an array of photosensors 20 arranged in rows and columns. The number of rows and columns of photosensors 20 (e.g., gated photosensitive diodes) is not at all critical, but for convenience, sensor 16 may be the Kodak KAI1000, with an array of 1024×1024 photosensors. Adjacent to and associated with each column of photosensors 20 is a vertical shift register 22. At an output end of each vertical shift register 22 is an electronic clock gate (ECG) 24 and the horizontal shift registers 26 and 28. A vertical scan generator 30 produces two signals $\phi V_1$ and $\phi V_2$ and couples them to CCD sensor 16 to drive vertical shift registers 22. A horizontal scan generator 32 produces three signals, $\phi H1A$, $\phi H1B$, and $\phi H2$ and couples them to CCD sensor 16 to drive horizontal shift registers 24 and 26. An output of horizontal shift register 26 follows one of two paths, 34 or 36, determined by the position of the switch 37. As shown, the output of horizontal shift register 26 is coupled to the path (line, conductor) 36 through the switch 37. Path 34 (line, conductor) leads through a video amplifier 38 and a sync insert circuit 40 to a video display 42. Path 36 leads through an analog amplifier 44, a clamping sample and hold circuit 46, an analog to digital converter (A/D) 48, and a first in, first out buffer (FIFO) 50 to one input of a multiplexer (MUX) 52. The output of horizontal shift register 28 follows a path that leads through an analog amplifier 54, a clamping sample and hold circuit 56, an analog to digital converter 58 and a FIFO 60 to a second input of multiplexer 52. An output of multiplexer 52 goes to a utilization device 62, which may be for example, a printer, a memory or a processor. A control system 64 controls system 10 by specifically controlling shutter 18, vertical and horizontal scan generators 30 and 32, respectively, ECG gates 24, sync insert circuit 40 and multiplexer 52.

Camera system 10, according to the invention, is capable of operating in two modes, namely, a low resolution viewing mode and a high resolution recording mode. In both modes each photosensor 20 accumulates a pixel charge that is proportional to the integral of the intensity of light received multiplied by the exposure time. When exposure time is completed, the pixel charge from each photosensor 20 is transferred into its associated vertical shift register 22. This frees the photosensors 20 to capture a new image when they are illuminated. All 1024 vertical shift registers are operated simultaneously to shift the pixel charges down, one horizontal row at a time, each row representing one line of the image. In the recording mode, two rows are shifted out of the vertical registers, one to fill each horizontal register 26 and 28. Registers 26 and 28 are then read out simultaneously, one charge at a time, into their respective identical output channels. In channel 36, selected by switch 37, amplifier 44 amplifies the analog value of each pixel charge. Clamping sample and hold circuit 46 adds the amplified charge value to a clamped reference voltage, samples the result at the pixel rate to obtain a discrete value for each pixel and holds it for conversion to a digital number by A/D 48. The digital output of A/D 48 is temporarily stored in FIFO 50. The output of register 28 is similarly processed and stored in FIFO 60. Multiplexer 52 connects one of its inputs at a time to its output to feed first the whole line of pixel data from FIFO 60, then that from FIFO 50 to utilization device 62 for image processing or storage. Two more lines are then shifted out of the vertical registers into the horizontal registers and read out simultaneously. The process is repeated until the entire 1024×1024 pixel image has been transferred to the utilization device. Successive lines of pixel data are received in successive, non-interleaved order, ideal for processing or printing. Although not necessary for the operation of the invention, the use of two horizontal registers doubles the output speed for a given channel bandwidth. With both channels operating at 20 MHz, 30 frames per second can be recorded. This is fast enough to record normal motion.

In the viewing mode, horizontal register 28 is not used, and ECG gate 24 is. In order to reduce the vertical resolution, half of the lines may be discarded. Furthermore, the remaining lines may be consolidated two into one by summing. To accomplish this, the first row of pixel charges out of vertical registers 22 is transferred to horizontal register 26. Then, before register 26 has started reading out, the second row of charges is transferred to register 26, right on top of the first row. Since device 16 is charge coupled, the second charge in each register cell is simply added to the first, forming one line of 1024 pixel sum charges. The third and fourth rows of pixel charges may then be discarded via the ECG gates, and register 26 is read out via video channel 34, selected by switch 37. The process of summing the next two lines in register 26, discarding the following two lines and reading out register 26 serially is repeated until the vertical registers are empty. The rates at which the horizontal and vertical shift registers are shifted are controlled by the signals generated by horizontal scan generator 32 and vertical scan generator 30. They may easily be made such that the line rate is similar to NTSC standards. This process produces a field of 256 lines.

To generate the next field, a new image is used. After the pixel charges are transferred into the vertical shift registers, four rows of charges are shifted out as before. This time, however, in order to produce the interleaving effect, the first two rows of each four are discarded, and the third and fourth rows are summed to produce one line of the field. Video amplifier 38 amplifies the signal, and sync insert circuit 40 inserts the horizontal and vertical sync and blanking pulses at the proper time to complete the NTSC-type signal to drive video display 42. With register 26 reading out at a 20 MHz rate, frames containing two interleaved fields can be produced at the NTSC rate of 30 per second. Video display 42 can therefore be a common television display. Although there are 1024 discrete pixel sum values read out of register 26 per line, at a rate of 20 MHz, video amplifier 38 need not have such bandwidth. In fact, an ordinary television video channel of 5 MHz bandwidth is sufficient to produce an image comparable to a standard television picture.

Figure 2:
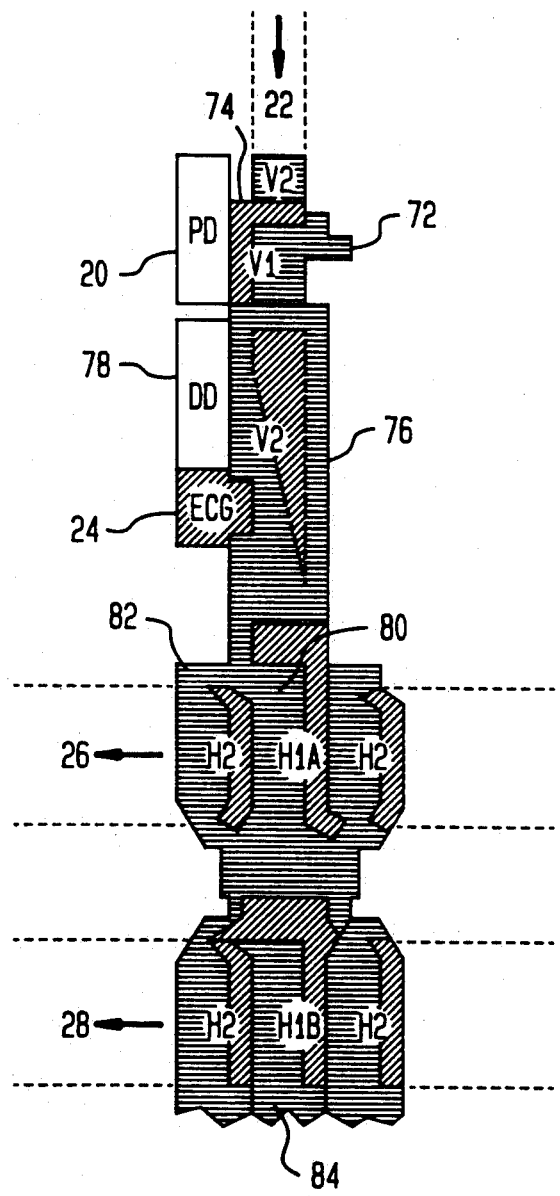
FIG. 2 is an illustration of part of a CCD sensor used in the camera system of FIG. 1.

To understand the way in which CCD sensor 16 is controlled to produce the two modes of operation, it is useful to consider some details of CCD sensor 16 which are shown in FIG. 2.

FIG. 2 shows a top view of various areas of semiconductor material that form ECG gates 24 and horizontal shift registers 26 and 28 at an output end of each vertical shift register and its associated column of photosensors 20. Areas with horizontal shading represent regions in the semiconductor material that are used to store charge, while those with diagonal shading represent implanted regions that form thresholds to guide the charges in the desired directions. The electrodes to which voltage is applied to control charge movement are not shown but lie on top of the affected semiconductor regions. Each region is labelled according to the electrode that controls it.

In general, each cell of a shift register has two electrodes controlling two storage regions. Charges are moved along a register by applying a set of complementary signals to adjacent electrodes. The signals alternate between a high value and a low value, setting up corresponding high and low fields in the controlled regions. The charges move from regions with low fields to regions with high fields. An implanted region, in general, forms a field which is lower than the storage field controlled by the same electrode. Vertical shift registers, therefore, have regions V1 and V2 and horizontal shift registers have regions H1 (shown as H1A and H1B) and H2. Since horizontal shift registers 26 and 28 are separately controlled, their H1 regions are labelled H1A and H1B, respectively.

During exposure time, light that falls on photosensors 20 (e.g., photodiodes, gated photosensitive diodes) generates a charge which is stored thereunder. When exposure is completed, a third level transfer voltage is applied to the electrodes controlling all regions V1. The transfer voltage is considerably higher than the high value used to shift the charges in the shift registers. As a result, the field in implanted region 74, which is always lower than that in region 72 and is also controlled by V1, goes higher than that in the photo diode storage region. The charge moves from under each photo diode 20, therefore, to its associated region 72, passing through implanted region 74. When the complementary signals of normal high and low value are subsequently applied, region 74 remains lower than the photocell region to allow the latter to accumulate charge while the vertical shift register is operating. When V1 goes low and V2 goes high, region 74 has an even lower field than region 72, and the charge moves from region 72 to region 76. When V2 subsequently goes low, if ECG 24 is high and H1A is low, the charge goes through ECG 24 to a dump diode 78 and thence to a power supply (not shown). If on the other hand, if H1A is high and ECG is low, the other hand, if H1A is high and ECG is low, the charge from region 76 passes to region 80 in horizontal register 26. At this point, the charge in region 80 can go in either of two directions. If, when H1A goes low, H2 is high, the charge goes to region 82 along horizontal register 26. If, on the other hand, when H1A goes low H1B is high, the charge passes to region 84 in horizontal register 28. The structure of CCD sensor 16 therefore allows some readout versatility.

Figure 3:
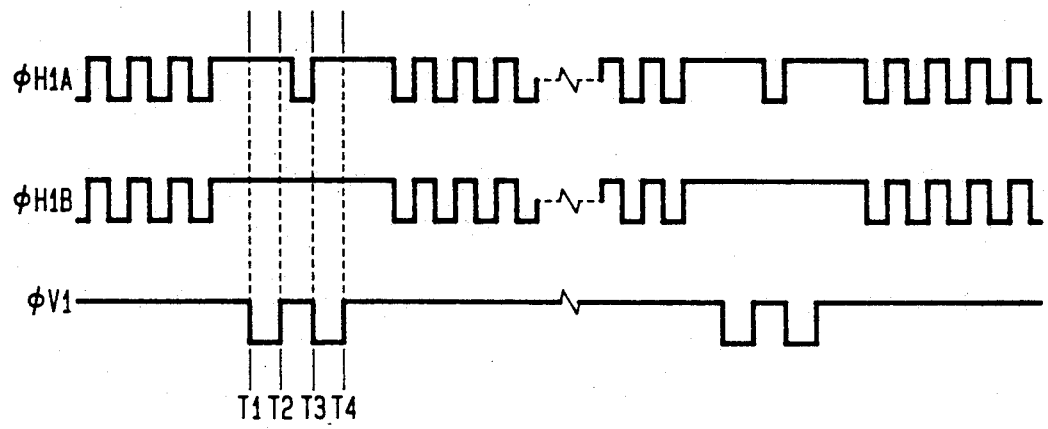
FIG. 3 is a timing diagram useful in explaining the operation of the system of FIG. 1 in a recording mode.

FIG. 3 shows a timing diagram which illustrates the time relationship of the voltage signals $\phi$H1A, $\phi$H1B and $\phi$V1 applied to the electrodes controlling regions H1A, H1B and V1, respectively, during a readout period of CCD sensor 16 in the record mode. Signals $\phi$H2 and $\phi$V2 (not shown) are the complements of signals $\phi$H1B and $\phi$V1, respectively. FIG. 3 is a timing diagram meant to show the order of events, and is not necessarily drawn to an accurate time scale. At a time T1, registers 26 and 28 have just emptied the contents thereof into their respective output channels, and signals $\phi$H1A and $\phi$H1B remain high; $\phi$V1 goes low (and $\phi$V2 goes high), driving a new line of charges into transfer regions 76. When $\phi$V1 subsequently goes high at a time T2, and $\phi$V2 goes low, the line of charges transfers into regions 80 controlled by $\phi$H1A. At time a T3, $\phi$H1A and $\phi$V1 both go low to drive the charges from regions 80 to regions 84 to fill register 28, and the charges in regions 72 to regions 76. $\phi$H1A then goes high, and when, at time a T4 $\phi$V2 goes low, the charges from regions 76 enter regions 80, filling register 26. In that manner, each horizontal register contains a line of pixel information for reading out serially as $\phi$H1 and $\phi$H2 alternate between high and low.

Figure 4:
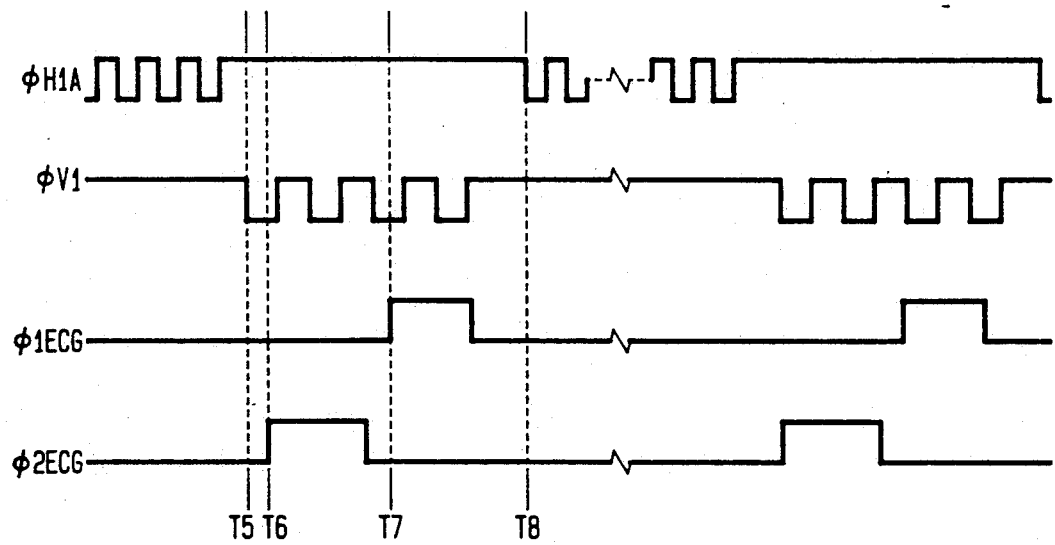
FIG. 4 is a timing diagram useful in explaining the operation of the system of FIG. 1 in a viewing mode.

FIG. 4 shows a timing diagram used to provide the interleaved NTSC type signal for the real time viewing mode. FIG. 4 is not necessarily drawn to scale, and the cycle times shown d not necessarily bear any relationship to those of FIG. 3. In this mode, register 28 is not used and ECG gate 24 is. FIG. 4 therefore shows the timing of signals $\phi$1ECG to create a first field and $\phi$2ECG to create the second, interleaved field, together with $\phi$H1A and $\phi$V1. Signals $\phi$H2, the compliment of $\phi$H1A, and $\phi$V2, the complement of $\phi$V1, are not shown. At a time T5, after register 26 has emptied out, $\phi$V1 starts through four complete cycles while $\phi$H1A remains high. During the first two of these cycles $\phi$1ECG, controlling ECG gate 24, is low. The result is that the first two lines of information shift into horizontal register 26, where they are automatically summed. At a time T7, while $\phi$V1 is low during its next cycle, $\phi$1ECG goes high and remains high through the end of the four $\phi$V1 cycles. This causes the third and fourth lines of pixel information to be discarded via the dump diodes 78. When register 26 is subsequently read out, starting at a time T8, one line of pixel information which represents the first two lines of captured information is read out to video channel 34. This pattern, which sums the first two and discards the last two lines of each four, is repeated until the vertical registers are empty, forming a field containing one line for each four lines of captured information.

For the subsequent field, after register 26 is emptied $\phi V1$ again starts four completes cycles to shift four lines down in the vertical shift registers. In this case, however, at a time T6, $\phi 2ECG$ controlling gate 24 goes high and stays high till the end of the first two cycles of $\phi V1$ and goes low for the last two. The result is that lines 1 and 2 are discarded and lines 3 and 4 are summed for output as the first line of the field. The pattern of discarding the first two lines and summing the third and fourth lines of each four continues until all the registers are empty to form the second field of the video signal. By alternating back and forth between fields, there is formed an interleaved signal with 256 lines per field, 512 lines per frame. The timing of the scan signals can easily be made so that the line and frame rates approximate the NTSC standards while leaving room for the insertion of sync and blanking pulses by sync inserter 40.

A method and apparatus have thus been described for generating an NTSC compatible signal for ordinary television screen viewing from a high resolution camera system with non-interlaced output which involve very little added expense.

It will be obvious that, while the particular method described for generating the viewing signal is very effective, many other variations will suffice. For example, instead of summing the first and second rows of pixel charges to form the odd field and the third and fourth rows to form the even field, any two rows can be summed for one field, the other two rows for the next field. Further, any single row of charges can be used instead of a sum. Still further, while reading out one video line for each four rows of photosensors provides a convenient reduction from a 1024×1024 sensor array to an NTSC signal, other ratios can be used to provide a workable interleaved signal, especially if the number of rows of photosensors is significantly different. To implement any one of these variations, all that has to be changed are the scan signals and the ECG gate signal. Furthermore, it is to be noted that the invention can use a CCD sensor other than the interline type described, as long as it has the equivalent of the ECG gates 24 and the dump diodes 78.

What is claimed is:

1. Apparatus for generating a low resolution interlaced video signal having alternating odd and even fields from a high resolution CCD camera system which produces pixel information representing an image in consecutive rows, the apparatus comprising:
   a video channel;
   dumping means for selectively discarding produced rows of pixel information;
   shift register means for transferring produced rows of pixel information into said video channel;
   driving means for driving said dumping means to repeatedly discard a first predetermined set of rows of each consecutive group of rows of produced pixel information representing a first image and alternating odd images thereafter, driving said shift register means to transfer to said video channel, in the order produced, the rows of produced pixel information not discarded by said dumping means, and driving said dumping means to repeatedly discard a second set of rows of each consecutive group of rows of produced pixel information representing a second image and alternating even images thereafter;
   the rows of pixel information transferred to said video channel representing said first and alternating odd images constituting said odd fields, and those transferred representing said second and alternating even images constituting said even fields of said video signal; and
   sync insert means for adding a horizontal blanking pulse and a horizontal sync pulse between each pair of consecutive lines of a field and a vertical blanking pulse and a vertical sync pulse between consecutive fields to complete said interlaced video signal.

2. The apparatus of claim 1 wherein each consecutive group includes four rows, said first predetermined set is the third and fourth rows of each consecutive group, and said second predetermined set is the first and second rows of each consecutive group.

3. Apparatus for generating a low resolution interlaced video signal having alternating odd and even fields from a high resolution CCD camera system which produces pixel information representing an image in consecutive rows, the apparatus comprising:
   a video channel;
   dumping means for selectively discarding produced rows of pixel information;
   shift register means for transferring produced rows of pixel information into said video channel;
   driving means for driving said dumping means to repeatedly discard a first predetermined set of rows of each consecutive group of rows of produced pixel information representing a first image and alternating odd images thereafter, driving said shift register means to transfer to said video channel, in the order produced, the rows of produced pixel information not discarded by said dumping means, and driving said dumping means to repeatedly discard a second set of rows of each consecutive group of rows of produced pixel information representing a second image and alternating even images thereafter;
   the rows of pixel information transferred to said video channel representing said first and alternating odd images constituting said odd fields, and those transferred representing said second and alternating even images constituting said even fields of said video signal; and
   wherein said driving means drives said shift register means to sum the rows of pixel information not discarded within each consecutive group of rows into one row before transferring to the video channel.

4. The apparatus of claim 3 wherein each consecutive group includes four rows, said first predetermined set is the third and fourth rows of each consecutive group, and said second predetermined set is the first and second rows of each consecutive group.

5. A method for generating a low resolution interlaced video signal having alternating odd and even fields from a high resolution CCD camera system which produces pixel information representing an image in consecutive rows, the method comprising the steps of:
   a. repeatedly transferring into a video channel a line of video information representative of a first predetermined set of rows, and discarding the other rows of each consecutive group of rows of produced pixel information representing a first image to form an odd field using a dumping means;

b. repeatedly transferring into said video channel a line of video information representative of a second predetermined set of rows, different from said first predetermined set of rows, and discarding the other rows of each consecutive group of rows of produced pixel information representing a second image to form an even field using a dumping means;

c. alternating between steps a and b; and d. adding a horizontal blanking pulse and a horizontal sync pulse between each pair of consecutive lines of a field and a vertical blanking pulse and a vertical sync pulse between consecutive fields to complete said interlaced video signal.

6. The method of claim 5 wherein n is four, said first predetermined row is the first and second rows, and said second predetermined row is the third and fourth rows.

7. The method of claim 6 further comprising before step a, the step of:

e. summing the first and second rows of each consecutive group of four rows of produced pixel information representing the first image, and after step a the step:

f. summing the third and fourth rows of each consecutive group of four rows of produced pixel information representing the second image.

8. A method for generating a low resolution interlaced video signal having alternating odd and even fields from a high resolution CCD sensor, said CCD sensor having an array of photosensors arranged in rows and columns, a vertical shift register associated with each of said columns of photosensors, first transfer means for transferring charges accumulated by said photosensors into respective cells of said vertical shift registers, a horizontal shift register, second transfer means at the output end of each of said vertical shift registers for transferring the charge in the last cell of each vertical shift register into a respective cell of said horizontal shift register, and dumping means for dumping the charge in the output cell of each of said vertical shift registers, the method comprising the steps of:

a. exposing said array of photosensors to a focused light image for a predetermined period;

b. transferring the charges accumulated by said photosensors into respective cells of said associated vertical shift registers;

c. repeatedly shifting the charges in said vertical shift registers forward, row by row;

d. transferring the charges in said first row of charges out of said vertical shift registers into respective cells of said horizontal shift register;

e. repeating step d with the second row of charges to form a row of summed charges;

f. dumping the third and fourth rows of charges out of said vertical shift registers;

g. reading out said horizontal shift register to form a line of a video signal;

h. adding a horizontal sync pulse and a horizontal blanking pulse to said video signal;

i. repeating steps d, e, f, g, and h until said vertical shift registers are empty to form said odd field;

j. adding a vertical sync pulse and a vertical blanking pulse to said video signal;

k. repeating steps a, b, and c;

l. dumping the first and second rows of charges from said vertical shift registers;

m. transferring the charges in said third row of charges out of said vertical shift registers into respective cells of said horizontal shift register;

n. repeating step m with the fourth row of charges to form a row of summed charges;

o. repeating steps g and h;

p. repeating steps l, m, n, and o until said vertical shift registers are empty to form said even field; and q. repeating step j.

* * * * *